United States Patent
Sukaria

(10) Patent No.: US 9,120,488 B2
(45) Date of Patent: Sep. 1, 2015

(54) INTEGRATED ENGINE TORQUE MODEL

(75) Inventor: Husein Sukaria, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1290 days.

(21) Appl. No.: 12/053,057

(22) Filed: Mar. 21, 2008

(65) Prior Publication Data

US 2009/0240415 A1    Sep. 24, 2009

(51) Int. Cl.
| | |
|---|---|
| *B60W 40/12* | (2012.01) |
| *B60W 40/10* | (2012.01) |
| *B60T 8/172* | (2006.01) |
| *B60W 40/072* | (2012.01) |
| *B60W 40/076* | (2012.01) |
| *B60W 50/08* | (2012.01) |

(52) U.S. Cl.
CPC .............. *B60W 40/10* (2013.01); *B60T 8/172* (2013.01); *B60W 40/072* (2013.01); *B60W 40/076* (2013.01); *B60W 50/082* (2013.01); *B60T 2250/02* (2013.01); *B60W 2530/14* (2013.01); *B60W 2550/142* (2013.01)

(58) Field of Classification Search
CPC .......... B60T 2250/02; B60W 2530/14; B60W 2550/142
USPC .............................. 701/1, 48, 70, 74, 84, 124
See application file for complete search history.

(56) References Cited

U.S. PATENT DOCUMENTS

| | | |
|---|---|---|
| 5,330,027 A | 7/1994 | Glover |
| 5,406,486 A | 4/1995 | Kamio et al. |
| 5,558,178 A | 9/1996 | Hess et al. |
| 5,676,112 A | 10/1997 | Bauer et al. |
| 6,553,297 B2 | 4/2003 | Tashiro et al. |
| 2002/0123829 A1* | 9/2002 | Kuriya et al. ...................... 701/1 |
| 2003/0195689 A1* | 10/2003 | Mori ................................ 701/70 |
| 2006/0244576 A1* | 11/2006 | Sugie et al. .................... 340/429 |
| 2007/0129873 A1* | 6/2007 | Bernzen ........................... 701/96 |

* cited by examiner

*Primary Examiner* — Redhwan k Mawari
*Assistant Examiner* — Rodney P King
(74) *Attorney, Agent, or Firm* — Julia Voutyras; Alleman Hall McCoy Russell & Tuttle LLP

(57) ABSTRACT

A method of operating a vehicle having at least a driven wheel, the driven wheel driven at least by a driving torque, includes maintaining an inclination angle of the vehicle in memory during a vehicle off condition; after starting the vehicle from the vehicle off condition, first updating a vehicle mass based on operating conditions including vehicle traveling conditions; and after updating the vehicle mass, updating the inclination angle based on operating parameters including vehicle traveling conditions.

9 Claims, 6 Drawing Sheets

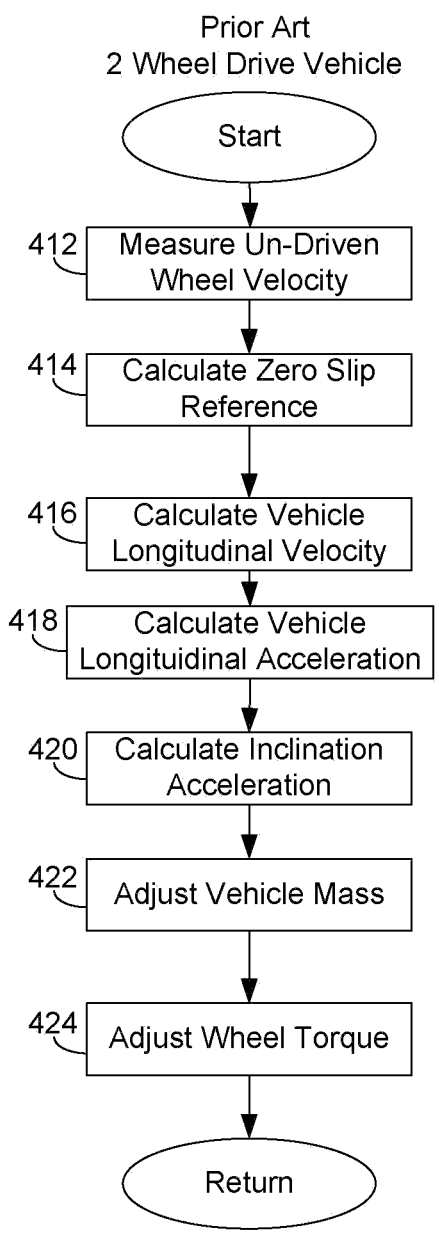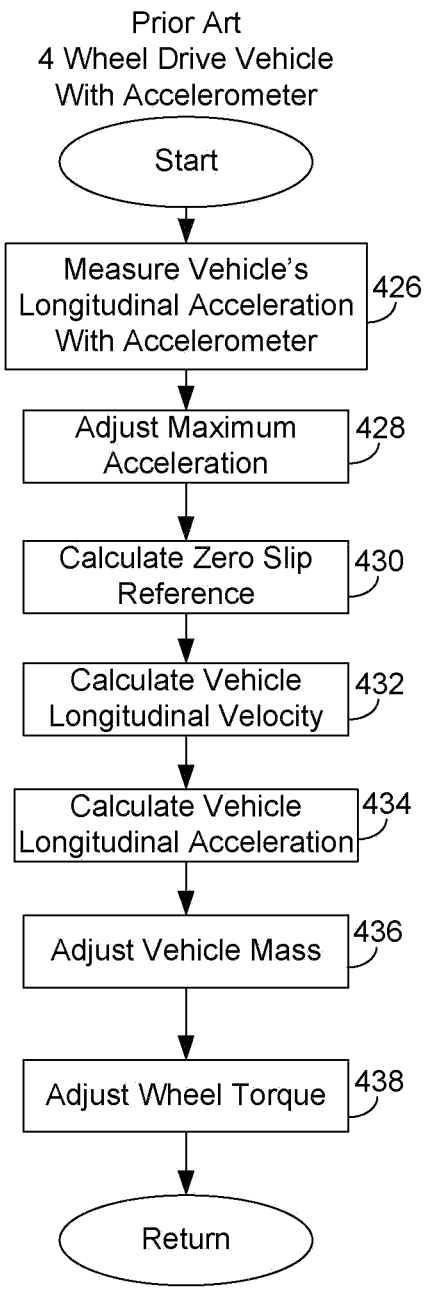
FIG. 4A
FIG. 4B

INTEGRATED ENGINE TORQUE MODEL

BACKGROUND/SUMMARY

Systems may control the engine in a vehicle based on the vehicle mass and inclination. For example, the engine output torque, wheel torque, or other operating parameters may be more accurately controlled to match driver requests when the vehicle mass and/or inclination can be estimated, measured, and/or otherwise identified.

One approach to identify vehicle mass and/or vehicle inclination is applicable in a four wheeled vehicle where only two wheels are driven. Specifically, un-driven wheel velocities are measured and used to determine, along with other parameters, the vehicles longitudinal velocity, longitudinal acceleration, mass, and inclination.

However, the inventors herein have recognized a potential disadvantage with such an approach. For example, in a vehicle with four-wheel drive, the torque applied to each wheels may cause a loss of traction on any and all wheels. Thus, the wheel velocities may not correlate with the vehicles longitudinal acceleration under selected conditions.

In another approach, one or more accelerometers may be used to identify vehicle mass and/or vehicle inclination. Again, the inventors have recognized a potential disadvantage with such an approach. In particular, the accelerometer sensor may degrade and/or may provide erroneous readings under selected conditions.

To address at least some of these issues, in one embodiment, a method of operating a vehicle having at least a driven wheel, may be used. The method may comprise maintaining an inclination angle of the vehicle in memory during a vehicle off condition; after starting the vehicle from the vehicle off condition, first updating a vehicle mass based on operating conditions including vehicle traveling conditions; and after updating the vehicle mass, updating the inclination angle based on operating parameters including vehicle traveling conditions.

In this way, it is possible to take advantage of the fact that in most circumstances, the surface inclination will not change when the vehicle is stopped (assuming it is not transported), and that the vehicle mass is most likely to change when the vehicle is stopped. Not only that, but the vehicle mass is further most likely not to change while the vehicle is moving, especially in the case of passenger vehicles and trucks. As such, improved estimates may be obtained, even without data from a longitudinal acceleration sensor.

In another embodiment, a method of operating a vehicle is provided having at least a driven wheel, the driven wheel driven at least by a driving torque, may be used. The method may comprise: during a first mode where the vehicle operates with the wheel driven and with reduced slip and where wheel speed response correlates to driving torque, updating at least one of vehicle inclination and mass during the first mode based on an operating parameter, and during a second mode where the vehicle operates with the wheel driven and with increased slip and where wheel speed response is un-correlated to driving torque, maintaining a previous value for at least one of inclination and vehicle mass. Further, when updating vehicle inclination and vehicle mass, an initial inclination from previous vehicle operation may first be used so that a new vehicle mass can be determined, and then after learning the vehicle mass, the inclination can again be updated.

In this way, both engine torque control and traction control may be improved. For example, it may be possible to identify vehicle inclination or mass with sufficient accuracy during non-slipping conditions, while avoiding inaccurate readings during slipping conditions. Likewise, it may be possible to accurately diagnose a degraded accelerometer sensor, even in 4×4 vehicles that may experience periodic slipping conditions.

In one particular example, improved operation may be achieved in a vehicle that selectively transfers torque from back to front wheels, of vice versa, responsive to slip, in coordination with engine-torque-reduction based traction control. When torque is primarily provided to one set of driving wheels, a second set of wheels may be used to estimate vehicle mass and/or inclination. However, during a slipping condition where traction control may intervene with driver requested torque, and where torque may be at least partially transferred and delivered to the second set of wheel via a transfer case, previous values of the inclination and/or mass may be used. In this way, even in 4×4 type vehicles, improved performance may be achieved.

BRIEF DESCRIPTION OF THE DRAWINGS

FIG. 4A shows a prior art method used to predict torque in a vehicle with two wheel drive.

FIG. 4B shows a prior art method used to predict torque in a vehicle with four wheel drive and an accelerometer.

DETAILED DESCRIPTION

Figure 1:
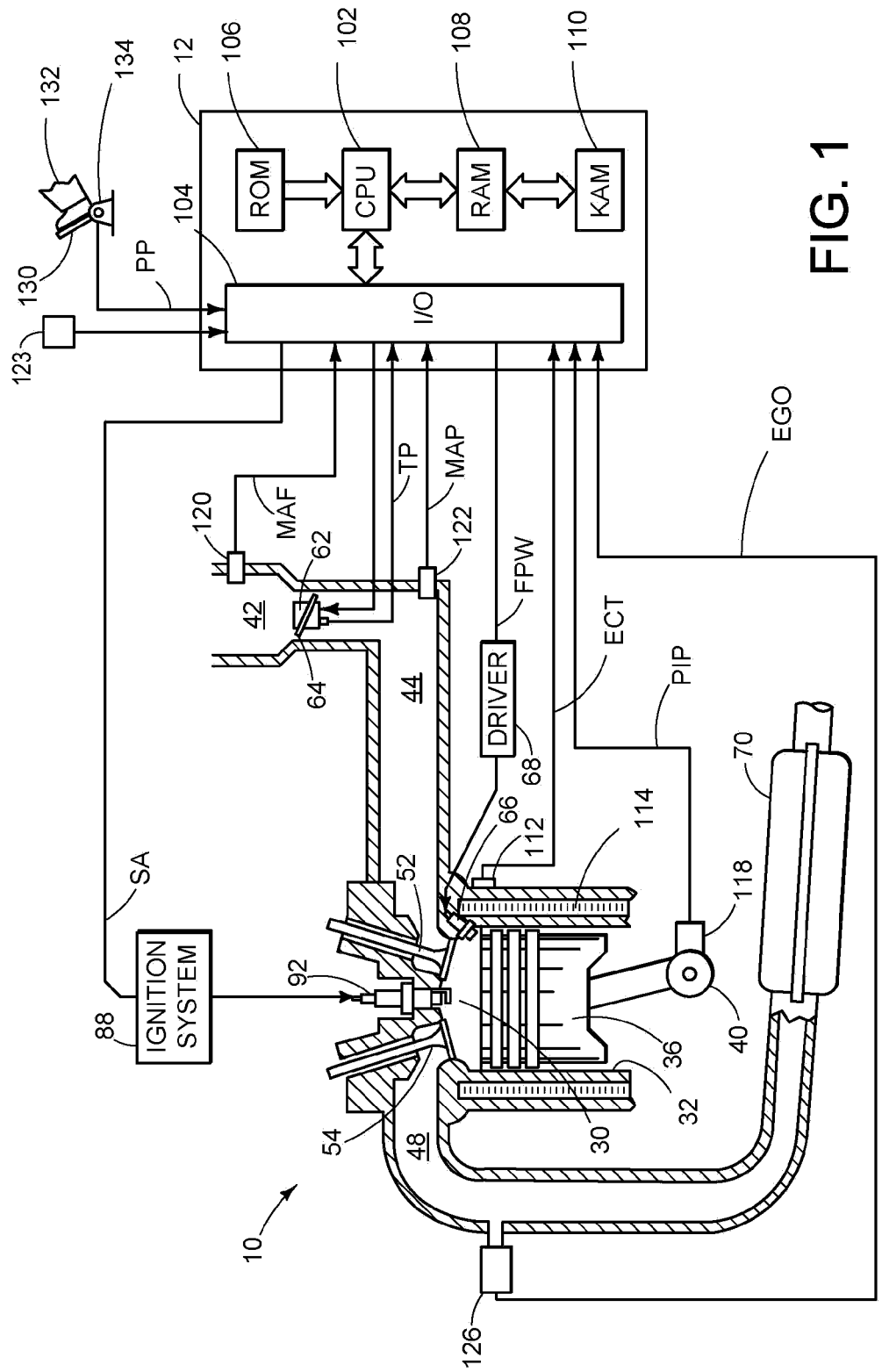
FIG. 1 shows an engine diagram.

FIG. 1 is a schematic diagram showing one cylinder of multi-cylinder engine 10, which may be included in a propulsion system of an automobile, truck, etc. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system, shown in FIG. 2. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Intake manifold 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake manifold 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, such as Non-Volitile RAM NRAM, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. An acceleration sensor 123 may be coupled to the controller. The inclination sensor may measure the acceleration of the vehicle. In other embodiments the acceleration sensor may be removed to reduce the cost of the vehicle.

Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

As described above, FIG. 1 shows only one cylinder of a multi-cylinder engine, and that each cylinder may similarly include its own set of intake/exhaust valves, fuel injector, spark plug, etc.

Figure 2:
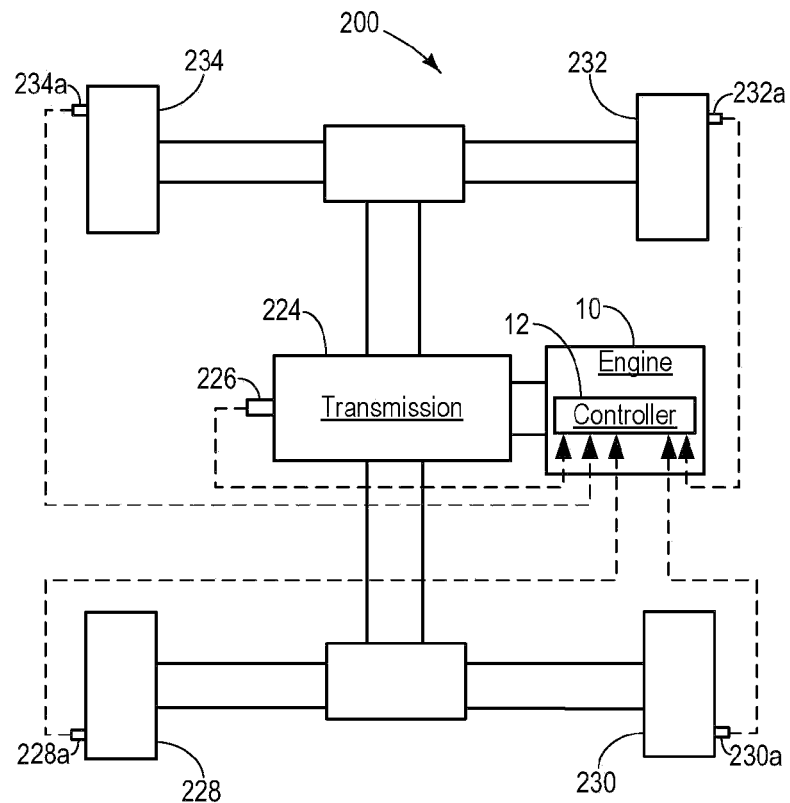
FIG. 2 shows a vehicle with the engine shown in FIG. 1, a transmission, and wheels.

FIG. 2 shows a schematic depiction of the transmission and associated system in the vehicle 200. Engine 10 may be operably coupled to an associated transmission 224. The transmission may have a plurality of selectable gears allowing the power from the engine to be transferred to the wheels. In another example, the transmission may be a Continuously Variable Transmission CVT that can change steplessly through an infinite number of gear ratios. In other examples, still other transmissions may be used that can transfer power from the engine to the wheels, such as an automatic or manual transmission. The transmission may be coupled to a torque convertor (not shown). The torque convertor may transfer the mechanical power from the engine to the transmission. In other examples, a mechanical clutch (not shown) may be used.

A gear position sensor 226, coupled to the transmission, may indicate the specific gear ratio that has been selected in the transmission by the controller or operator. The transmission may include additional sensors such as a temperature sensor (not shown). The transmission may be operably coupled to 4 wheels, 228, 230, 232, and 234. In other embodiments, the transmission may be coupled to an alternate number of wheels, i.e., the transmission may drive a plurality of wheels, such as 6 or 8 wheels, or a single wheel.

There may be an associated velocity sensor coupled to each of the wheels of the car, 228a, 230a, 232a, and 234a, respectively. The velocity sensor may be referred to as wheel speed sensors. The velocity sensors may measure the rotational speed of each individual wheel. Controller 12 may receive signals from the wheel velocity sensors. In some examples a longitudinal accelerometer (not shown) may be coupled to the vehicle. The longitudinal accelerometer may measure the vehicles longitudinal acceleration. The longitudinal accelerometer may send signals to controller 12. In other examples the longitudinal accelerometer may be removed.

Brake actuators (not shown) may be attached to each wheel, allowing the brakes to be actuated by an electronic pulse from the controller. Both the wheel velocity sensors and the brake actuators may be controlled by a traction control model, discussed in more detail herein.

The traction control model may be a program or a series of programs executed in controller 12. The traction control model may be used to improve the ability of the vehicle to maintain a grip on a road surface (not shown), preventing the car from experiencing skids, etc. For example, one element of the traction control system may be an Anti-Lock Braking System ABS where the brakes are actuated repeatedly to prevent the wheels from locking up and going into a skid. Various parameters of the vehicle may be adjusted to increase the stability of the vehicle, such as retarding or suppressing the spark to one or more cylinders, reducing fuel supply to one or more cylinders, braking one or more wheels, closing the throttle, and/or various others. Additionally, the vehicle may include a turbo-charger (not shown), where the boost control solenoid can be actuated to reduce boost and therefore reducing engine power to improve vehicle stability/traction.

The traction control model may also determine vehicle velocity from the wheel speed sensors. For example, the vehicle velocity calculation may take into account the friction between the road surface and the wheels, assuming the friction between the wheels and the road surface is high enough so that the wheels do not slip, i.e. loose traction. In particular, the wheel velocity may be used by the traction control model to determine when a loss of traction has occurred between the various wheels and the road surface.

An engine torque model may be a program or a series of programs executed in controller 12 allowing the requested torque to correspond with the delivered wheel torque, as well as improving the air fuel-feedback control and increasing the efficiency of the engine. The engine torque model may calculate the torque delivered to the wheels. This value may then be used to adjust the air fuel feedback control in the engine, thereby adjusting the engine torque. The engine torque model may use sensors such as the throttle position sensor, crank angle sensor, intake manifold pressure sensor, etc.

Figure 3:
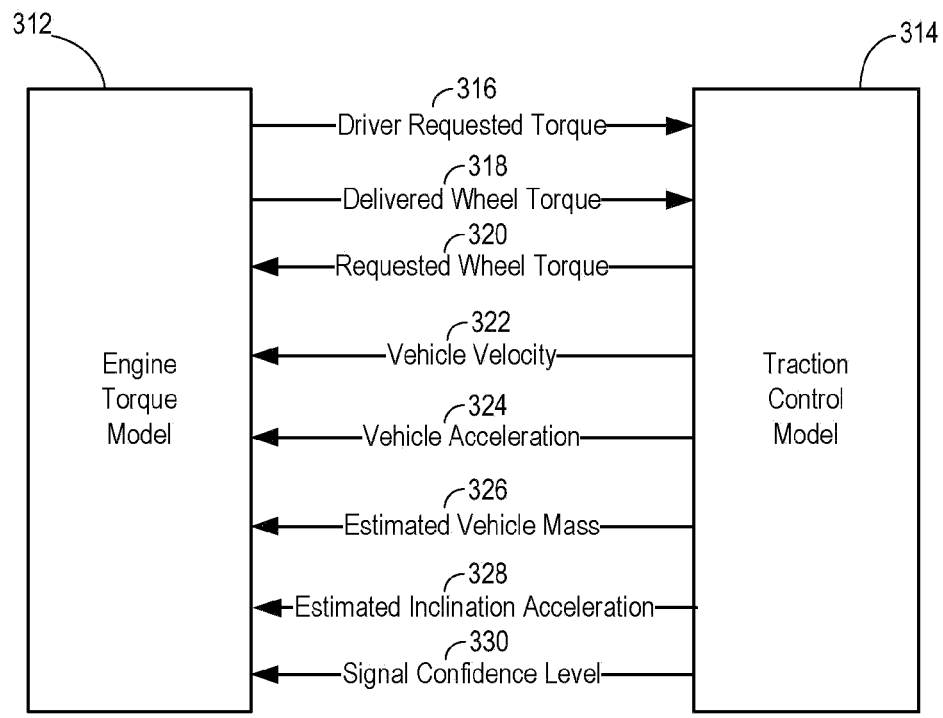
FIG. 3 shows a representation of the traction control model and the engine torque model that may be carried out in the controller.
Figure 5:
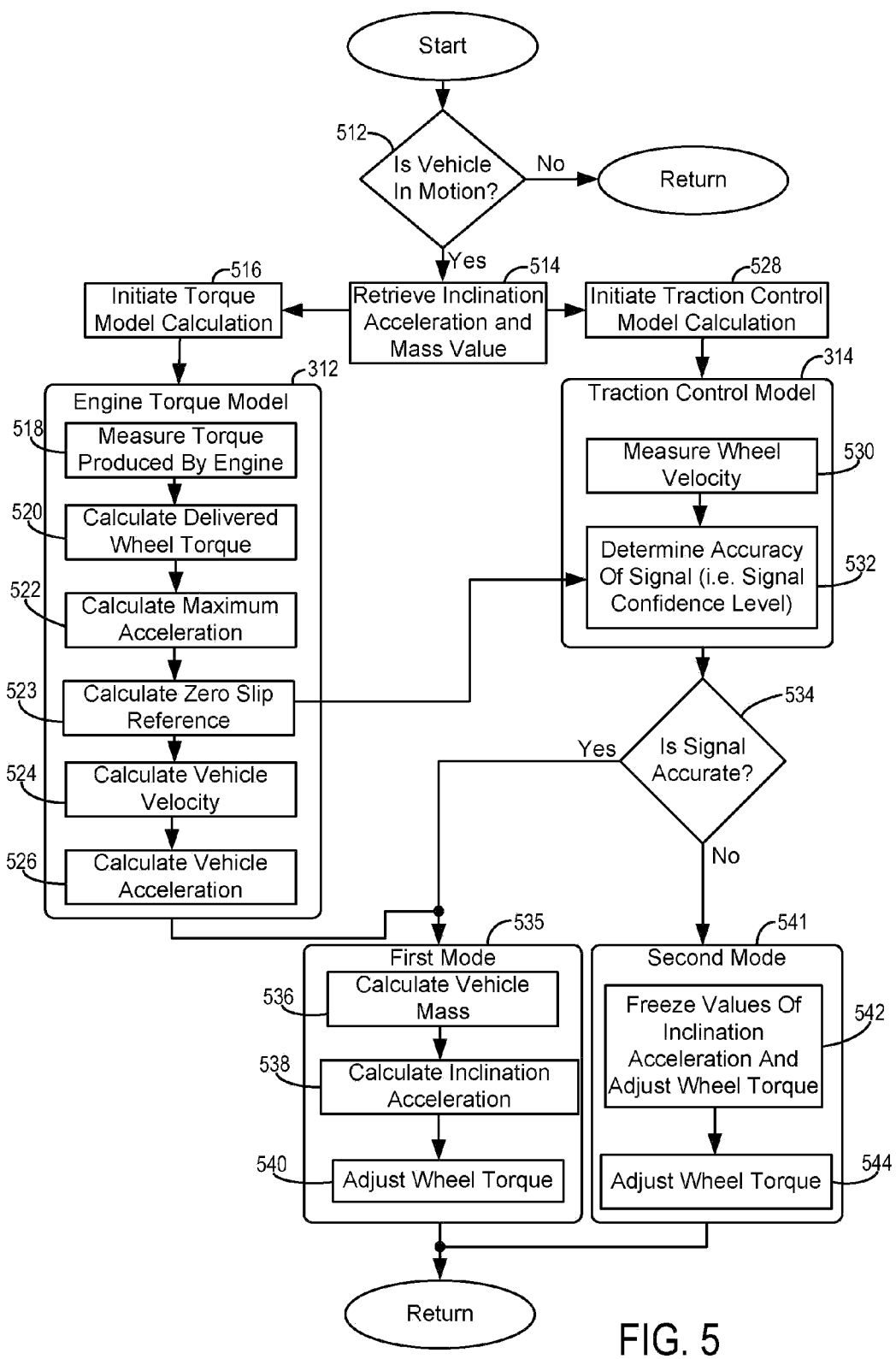
FIG. 5 shows a method used to calculate engine torque in a vehicle.
Figure 6:
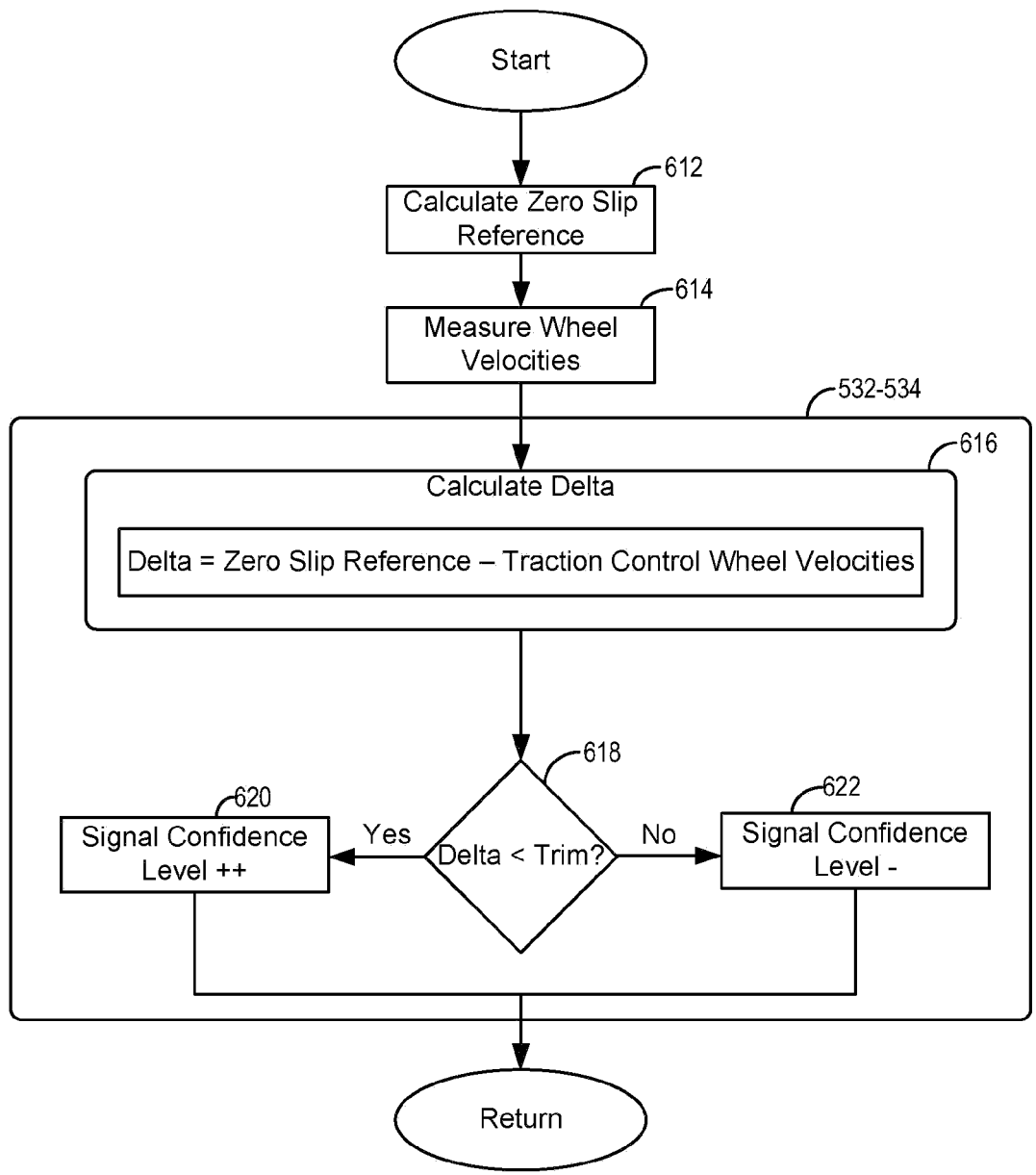
FIG. 6 shows an expanded view of how the confidence level of the vehicle velocity measured by the traction control system is measured.

FIG. 3 shows a representation of how the traction control model 314 and engine torque model 312 may interact. Each of these models may use a number of variables to calculate various vehicle parameters. The variables used in the traction control model and the engine torque model may include: Driver Requested Wheel Torque 316, Delivered Wheel Torque 318, Requested Wheel Torque 320, Vehicle Velocity 322, Vehicle Acceleration 324, Estimated Vehicle Mass 326, Estimated Inclination Acceleration 328, and Signal Confidence Level 330, explained in greater detail herein. Example methods used to calculate these specific variables are shown in FIG. 5 and FIG. 6.

In one example, the Driver Requested Wheel Torque may be calculated by the Traction Control Model 314 based on pedal position (PP) and vehicle speed, for example. These values may then be used in the Engine Torque Model 312 to calculate the amount of torque delivered by the engine to the wheels.

FIG. 4A shows a prior art engine torque model in a two wheel drive 2WD vehicle. This method of velocity calculation uses the un-driven wheel velocity to calculate the vehicles longitudinal velocity, and then from that the longitudinal velocity, the longitudinal acceleration. The zero slip reference, referred to in 414 as well as 430, is an estimate of the vehicles longitudinal acceleration based on the delivered wheel torque and un-driven wheel velocity, assuming there is no loss of traction between the wheel and the road surface. This model can produce accurate predictions of the vehicle mass and/or vehicle inclination angle in a 2WD vehicle, but as noted herein, may produce degraded results in a vehicle where all wheels may be driven at least in some conditions (e.g., 4WD).

FIG. 4B shows a prior art engine torque model in a vehicle utilizing a four wheel drive system incorporating an accelerometer. The accelerometer is used in conjunction with various sensors to calculate the vehicles inclination and mass. As previously noted, an accelerometer may degrade. Further, under some conditions the accelerometers may be susceptible to increased noise, such as on very rough roads, even when using low or high pass filters.

As discussed in greater detail herein, an approach is described for identifying vehicle mass, vehicle inclination, and vehicle acceleration in a vehicle without un-driven wheels (such as a 4×4, all wheel drive, etc.), a vehicle utilizing an accelerometer, and/or combinations thereof. One example approach is described in FIG. 5, which may use an iterative approach.

Specifically, FIG. 5 shows a diagram of how the engine torque model and the traction control model interact to calculate the vehicle's delivered torque by calculating the vehicle's mass and inclination acceleration. In one example, these calculations may be carried out in controller 12. In another example these calculations may be carried out in a separate controller (not shown), or in a plurality of networked controllers. This method may be carried out periodically during operation of the vehicle, such as when the vehicle is in motion. The method may be implemented in a vehicle that includes at least a driven wheel, the driven wheel driven at least by a driving torque. In some examples the vehicle may include driven 4 wheels.

At 512, it is determines if the vehicle is in motion. This may be carried out by the controller or another control system located in the vehicle. If it is determined that vehicle is not in motion, the routine returns to the start.

If it is determined that the vehicle is in motion, the routine then proceeds to 514, where the previous determinations of the vehicle's inclination acceleration value and mass are retrieved from the controller. In one example, the inclination acceleration value may be stored in the NRAM (non-volatile RAM). In other examples the inclination acceleration value may be stored by another suitable means. If a previous inclination acceleration and vehicle mass has not been stored, a default value may be used. The default mass value may be a light loaded vehicle weight LLVW and the default inclination may be 0 degrees. In one example, the LLVW may be the unloaded weight of the vehicle plus the weight of one average size passenger. In another example, the default inclination acceleration and vehicle mass may be other suitable values.

The routine then proceeds to 516, where the torque model calculation is initiated. The torque model calculation may be initiated periodically during operation of the engine to improve torque control of the vehicle and thus allow the requested torque to closely match the delivered torque.

At 518 the torque produced by the engine may be measured. This value may be measured by sensor 118. In alternate embodiment, the torque produced by the engine may be determined based on engine airflow, engine speed, fuel injection amount, and/or combinations thereof.

The routine then advances to 520, where the delivered wheel torque is calculated. This calculation may take into account various parameters such as gear position, engine torque, transmission losses, etc. The gear position may be measured by sensor 126. In another example the gear position may be measured by another suitable sensor.

The routine proceeds to 522, where the maximum acceleration of the vehicle is calculated. The maximum acceleration may be calculated by dividing the delivered wheel torque by the vehicles mass multiplied by the wheel radius, shown in equation 2 below. The wheel radius may be assumed constant or varied based on tire pressure.

$$\text{Maximum Acceleration} = \frac{\text{Delivered Wheel Torque}}{\text{Vehicle Mass} * \text{Wheel Radius}} \quad (2)$$

In some examples, the maximum acceleration may be calculated using a look up table stored in controller 12.

The routine then proceeds to 523, where the zero slip reference is calculated. The zero slip reference is an estimated value of the vehicles longitudinal acceleration, assuming that the rotational acceleration from the wheels is transferred to longitudinal acceleration (e.g., the wheels do not loose traction). The maximum acceleration may serve as an upper limit for the zero slip reference. The zero slip reference value may be used in the traction control model calculation discussed in more detail herein.

The routine then advances 524, where the vehicle's longitudinal velocity is calculated. This calculation may take into account such parameters as losses from the transmission, wheel velocity, zero slip reference, friction coefficient of the wheels, wheel radius, maximum acceleration, etc. In some examples an average velocity of the wheels of the vehicle may be used to calculate the vehicle longitudinal velocity. In other examples the wheel that is has the most traction may be used to calculate the vehicle velocity.

The routine then proceeds to 526, where the acceleration of the vehicle is calculated. In some examples, the acceleration value may be calculated by taking the derivative of the vehicle velocity calculated in 524. In other examples, the vehicle's velocity may be calculated using equation 3 given below.

$$\text{Vehicle Accleration} = \frac{\text{Delivered Wheel Torque}}{\text{Vehicle Mass} * \text{Wheel Radius}} - \text{Inclination Accleration} \quad (3)$$

From 514 the routine also advances to 528, where the traction control model calculation is initiated.

The routine then advances to 530, where the velocity of the vehicle is measured by sensors associated with the traction control model. In some examples, wheel velocity sensors (228a, 230a, 232a, and 234a) may be used to measure the wheels velocity, where the longitudinal velocity of the vehicle can be calculated from the velocity of the wheels.

The routine then proceeds to 532, where the signal confidence level is calculated (see FIG. 6). In one example, the signal confidence level may be a measure of the amount of traction that the vehicle's wheels are experiencing, thus providing an indication of an amount of wheel slip of the driven wheels. In one example, the signal confidence may be a percentage value based on an average slip level of each of four driven wheels of a vehicle, in the example of a 4WD and/or AWD vehicle. Further in this example, the accuracy of the signal is calculated using the zero slip reference value, calculated at step 523.

The routine then advances to 534, where it is determined if the signal is accurate. In one example, the routine may determine whether the confidence level is greater than 90%. In other examples, the percentage may be altered to account for various parameters in the system such the accuracy of the sensors, desired torque, delivered torque, etc.

If the signal confidence level is above 90% i.e. the vehicle is substantially non-slipping, operating under reduced slip, and/or wheel speed response correlates to driving torque, the routine initiates a first mode of operation 535. The first mode of operation may include step 536-540. In the first mode of operation the wheels may be driven and substantially non-slipping. At 536 the mass of the vehicle may be calculated using equation 4 given below.

$$\text{Vehicle Mass} = \frac{\text{Delivered Wheel Torque}}{\text{Wheel Radius} * (\text{Vehicle Acceleration} + \text{Inclination Accleration})} \quad (4)$$

In other examples the mass of the vehicle may be calculated based an accelerometer and degradation of the accelerometer may be determined based on the updated vehicle mass. The inclination acceleration may be a vehicle inclination maintained from a previous vehicle operation. In this way the vehicles mass may be updated.

The routine then proceeds to 538 where the inclination acceleration is calculated using the confidence level, the maximum acceleration, and the delivered torque calculated by the engine torque model. The inclination acceleration may be calculated by the example equations below.

$$\text{Inclination Accel. Ratio} = \text{Light Filtered}\left(\frac{\text{Max Accel.}}{\text{Vehicle Accel.}}\right) - \text{Heavy Filtered}\left(\frac{\text{Max Accel.}}{\text{Vehicle Accel.}}\right) \quad (5)$$

$$\text{Inclination Acceleration} = \text{Inclination Accel. Ratio} * \text{Vehicle Acceleration} \quad (6)$$

In this way the vehicles inclination acceleration or inclination may be updated. In other examples the vehicle inclination acceleration may be calculated based on an accelerometer and the controller may determine degradation of the accelerometer based on the updated vehicle's inclination. From 526 the routine advances to 536, as well.

The routine then proceeds to 540. Where the torque produced by the engine or wheel speed response may be adjusted based on the inclination acceleration and vehicles mass values calculated in 536 and 538, respectively. For example, if the inclination acceleration is increased, then the amount of fuel delivered to the cylinders may be increased to increase the torque produced by the engine to provide consistent acceleration performance, for example. In this way the engine output may be adjusted responsive to the updated and maintained vehicle inclination and vehicle mass. The routine will then return to the start.

However, if the signal confidence level in not above 90% i.e. the vehicle operates with the wheel(s) driven with increased slip, the wheel(s) driven are substantially slipping, and/or where wheel speed response is un-correlated to driving torque, the routine initiates a second mode of operation 541. The second mode of operation may include steps 542 and 544. In the second mode of operation the wheels may be driven and substantially slipping. At 542 where the previous values of inclination and wheel mass are stored in the controller. In this way the inclination and mass are maintained during the second mode. As previously noted, in other examples, these values may be stored in a separate controller located in the vehicle.

The routine will proceeds to 544 where the wheel torque or wheel speed response may be adjusted based on the previous values of inclination acceleration and vehicle mass stored in the controller. In this way, during a first mode the wheel speed response can be correlated to driving torque, updating at least one of the vehicles inclination and mass based on an operating parameter. During a second mode the vehicle may operate with increased slip, where wheel speed response is un-correlated to driving torque. During the second mode a previous value of the vehicles inclination and mass may be maintained.

In some examples during the first and second mode the vehicle may be operated with 4 driven wheels.

FIG. 6 shows a flow chart of the method used to calculate zero slip reference and the signal confidence level used in the method of FIG. 5.

At 612, the zero slip reference value, an estimated value of the vehicles longitudinal acceleration, is calculated. The zero slip reference may be calculated by the controller. The delivered torque delivered may be one parameter used to calculate the zero slip reference. The zero slip reference may be calculated assuming there is no loss of traction (i.e. slip) between the driven wheel and the road surface.

The routine then proceeds to 614, where a wheel velocity may be measured from a velocity sensor coupled to a wheel on the vehicle. In alternate embodiments, the velocity of multiple wheels may be measure and then compared to perform system diagnostics, assessing if a wheel velocity sensor has degraded. In still further alternate embodiments, the wheel velocity may be calculated by a system that is not associated with the traction control model.

In this example steps 616-622 represent steps 532-534, shown in FIG. 5. In other examples another suitable means of calculating the signal confidence level may be used.

The routine advances to 616, where Delta is calculated by subtracting the wheel velocity measured by the velocity sensors from the zero slip reference wheel velocity, shown in the equation 7 below.

$$\text{Delta}=\text{Zero Slip Reference}-\text{Traction Control Wheel Velocities} \quad (7)$$

The routine then proceeds to 618, where it is determine if Delta is less than a Trim value, allowing the confidence in the signal produced by the traction control model to be assessed. The Trim may be calculated periodically, every iteration, or may be a preset value stored in the controller.

If Delta is less than Trim the routine proceeds to 620, where the signal confidence level is increased. The signal confidence level may take on any value from 0-1. In alternate embodiments, the signal confidence level may fall within a different range of numbers. The signal confidence level is a measurement of the accuracy of the values calculated by the traction control model, in particular the wheel's velocity measured by the wheel velocity sensors and the vehicles longitudinal velocity calculated using the wheel's velocity.

However, if Delta is greater than the Trim, then the routine proceeds to 622 where the signal confidence level is decreased. The routine then returns to the start. In other examples, the signal confidence level may be determined using another suitable algorithm.

In this way, it is possible to utilize expected wheel accelerations of a plurality of driven wheels (e.g., all driven wheels), which can then be compared with actual wheel acceleration to identify whether conditions are present where the vehicle acceleration and/or mass may be updated. When the wheels are experiencing low slip conditions the confidence level is increased due to the correlation between wheel's rotational acceleration and the vehicles longitudinal acceleration. On the other hand, when the wheels are experiencing high slip conditions, e.g. the applied torque delivered to the wheels is creating a loss of traction between the wheel and the road surface, the signal confidence level is decreased due to the lack of correlation between the wheel's rotational acceleration and the vehicles longitudinal acceleration. In this way, both engine torque control and traction control may be improved.

Figure 7:
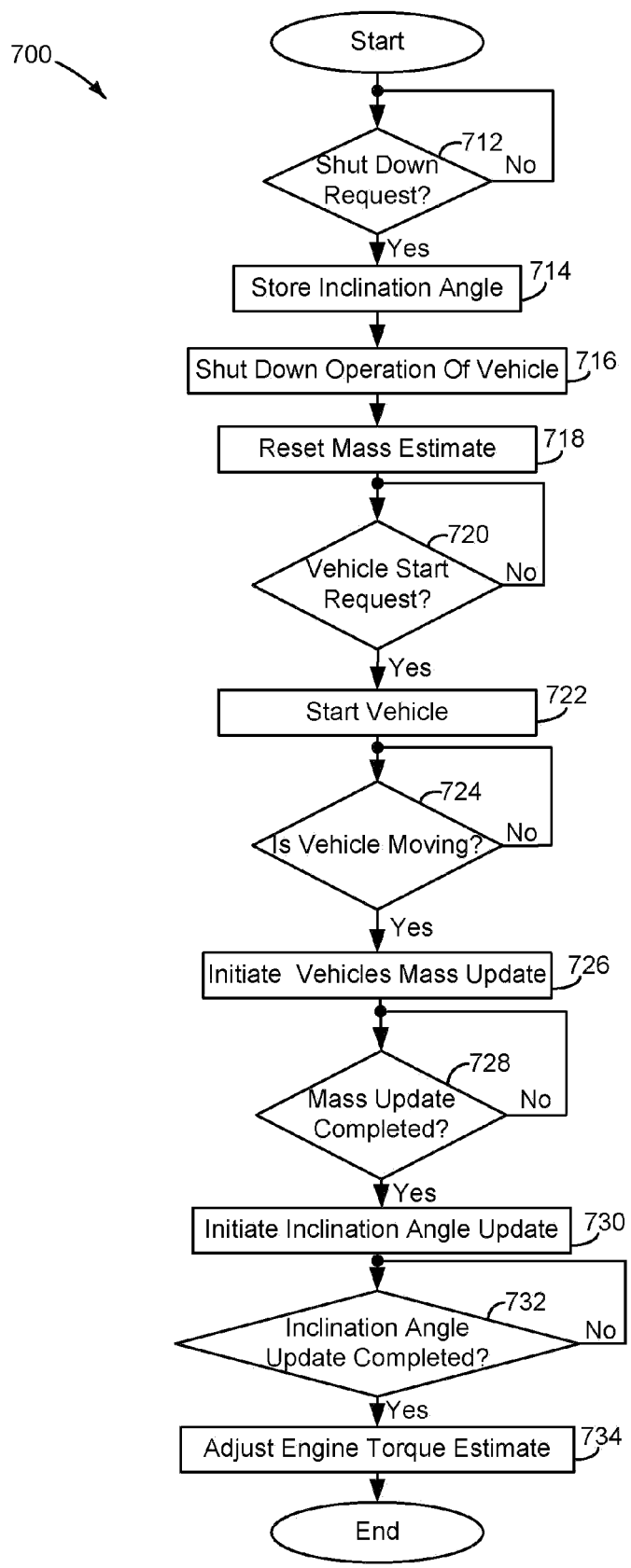
FIG. 7 shows a method that may be used to calculate and update a vehicle mass and vehicle inclination after a vehicle has been shut down and subsequently started.

FIG. 7 shows a method 700 that may be implemented in a vehicle to accurately provide driver torque requests after vehicle start up. In some examples the vehicle may not contain a longitudinal accelerometer. Specifically, method 700 operates to enable improved learning of vehicle mass and inclination by assuming that the vehicles inclination does not change after the vehicle is shut down and then subsequently started up, and that the mass of the vehicle is more likely to change than the vehicle inclination after the vehicle is shut down and then subsequently started up.

At 712 it is determined if a shut down request has been made. A shut down request includes: rotation of an ignition key, actuation of a push button ignition, etc. If a shut down request has not been made the method returns to 712. In other examples the method may wait for a period of time before returning to 712.

However, if a shut down request has been made, the methods advances to 714, where a vehicle inclination angle is stored in the non-volatile RAM. In other examples, an inclination acceleration may be stored. Yet, in other examples, other suitable computer storage approaches and/or parameters may be used. In this way, an inclination angle of the vehicle may be stored in the vehicle memory during a vehicle off condition. A vehicle off condition may include a time period after the operation of the vehicle has been stopped and before a subsequent start up. In some examples, an inclination acceleration may be calculated using the routine described in FIG. 5, specifically step 538. Once the inclination acceleration is calculated, the inclination can be correlated to the inclination angle. In other examples, the inclination angle may be calculated using another suitable method.

The method then advances to 716 where the operation of the vehicle is shut down. Shutting down the operation of the vehicle may include the following actions: seating and sealing intake and exhaust valves in the engine, inhibiting fuel from being injected in to the cylinder, and various others.

The method then proceeds to 718 where the estimated mass of the vehicle is reset. In some examples the mass estimate may be reset to a predetermined value such as the mass of the vehicle without cargo or passengers, or with a predetermined number of passengers. In other examples, another suitable value of mass may be used when the estimated mass of the vehicle is reset.

The method then proceeds to 720 where it is determined if a vehicle start has been requested. A vehicle start request may include the following actions: rotation of an ignition key, actuation of a push button ignition, and various others.

If a vehicle start has not been requested the method returns to 720. In other examples, the method may wait for a period of time before returning to 720. However, if a vehicle start has been requested the method advances to 722 where the vehicle is started. Starting the vehicle includes the following actions: actuating intake and/or exhaust valves, initiating a spark in the cylinder, delivering fuel to the cylinder, actuating the fuel delivery system, adjusting the throttle, and/or various others.

The method then proceeds to 724 where it is determined if the vehicle is moving. In other examples it may determined if the vehicle has been moving for a predetermined period of time. If it is determined that the vehicle is not moving the method returns to 724. In other examples the method may wait for a period of time before returning to 724.

However, if it is determined that the vehicle is moving the method advances to 726 where the vehicle mass update is initiated. In some examples the initiation of the update of the vehicle mass may include initiation of a vehicle mass update algorithm. The algorithm may calculate the vehicle's mass based on the inclination angle stored at step 714 and other vehicle traveling conditions which may include: engine torque, delivered wheel toque, vehicle velocity, vehicle acceleration, and various others. In some examples, the algorithm shown in FIG. 5, specifically at step 536, may be used. In other examples, another suitable mass estimate algorithm may be initiated. In this example, longitudinal accelerometer data is not used to estimate the vehicles mass, however, in other examples it may be used, if desired.

After 726 the method proceeds to 728 where it is determined if the vehicles mass update is complete. Completion of the vehicle mass update may include completing the vehicle mass update algorithm, sending the updated vehicles mass on the Computer Area Network CAN, and/or storing the updated vehicles mass in the RAM. If the vehicle mass update has not been completed the method returns to 728. In other examples the method may wait for a period of time before returning to 728.

However if the vehicles mass update has been completed the routine advances to 730 where the vehicle's inclination angle and/or inclination acceleration update is initiated. Initiation of the vehicle's inclination angle and/or inclination acceleration may include implementation of a vehicle inclination angle algorithm. The vehicle inclination algorithm may include implementation of step 538, shown in FIG. 5. The mass update calculated in steps 726-728 as well as other vehicle traveling conditions which include estimated vehicle mass, engine torque, delivered wheel toque, vehicle velocity, vehicle acceleration, etc., may be used to calculate the vehicles inclination angle and/or inclination acceleration. In other examples, another suitable vehicle inclination angle algorithm may be used to calculate the vehicle's inclination angle and/or inclination acceleration where the mass update calculated in steps 726-728 may be used in the calculation as well as other vehicle traveling conditions.

The method then advances to 732, where it is determined if the vehicle's inclination angle and/or inclination acceleration update has been completed. The vehicle inclination angle and/or inclination acceleration update completion may include completion of the inclination angle algorithm, sending the updated inclination angle and/or inclination on the CAN, and/or storing the inclination angle and/or inclination acceleration in the RAM. If the vehicles inclination angle and/or inclination acceleration update has not been completed the method returns to 732. In other examples the method may wait for a period of time before returning to 732.

However, if the vehicles inclination angle and/or inclination acceleration update has been completed the method advances to 734 where the engine torque estimate is adjusted based to the inclination angle and/or inclination acceleration update, as well as the vehicle mass update. After 734 the method ends. In other examples after 734 the method may return to 730 where the inclination angle and/or inclination acceleration may be updated continuously. Further, in other examples, the method may wait for a predetermined period of time to return to 734. In this way the inclination angle and/or inclination acceleration can be updated periodically.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating a vehicle having at least a driven wheel, the driven wheel driven at least by a driving torque, comprising:
   maintaining an inclination angle of the vehicle in microprocessor memory during a vehicle off condition;
   after starting the vehicle from the vehicle off condition, first updating a vehicle mass based on the maintained vehicle inclination angle;
   after updating the vehicle mass, updating the inclination angle based on operating parameters including vehicle traveling conditions; and
   adjusting engine output based on the updated inclination angle.

2. The method of claim 1 where the updating of vehicle mass is performed without longitudinal acceleration sensor data.

3. The method of claim 1 further comprising adjusting an engine torque estimate in response to the updated vehicle mass and inclination angle.

4. The method of claim 1 wherein updating the inclination angle further includes updating the inclination angle based on the updated vehicle mass.

5. The method of claim 1 wherein updating the inclination angle based on operating parameters further includes updating the inclination angle based on the updated vehicle mass.

6. A method for a vehicle having a wheel driven by engine torque, comprising:
   maintaining a vehicle inclination angle in microprocessor memory during a vehicle-off and stopped condition;
   after starting the vehicle from the vehicle-off condition, first updating a vehicle mass based on the maintained vehicle inclination angle;
   after updating the vehicle mass, updating the inclination angle based on vehicle traveling conditions, and
   adjusting engine torque based on the updated inclination angle.

7. The method of claim 6 wherein the vehicle is a passenger vehicle.

8. The method of claim 7 further comprising adjusting vehicle traction control operation based on the updated vehicle mass.

9. The method of claim 6 wherein updating the inclination angle based on the vehicle traveling conditions further includes updating the inclination angle based on the updated vehicle mass.

* * * * *